June 29, 1965 R. B. DUSTRUDE 3,191,648
FOLDING FRAME HANDSAW
Filed March 5, 1964 2 Sheets-Sheet 1
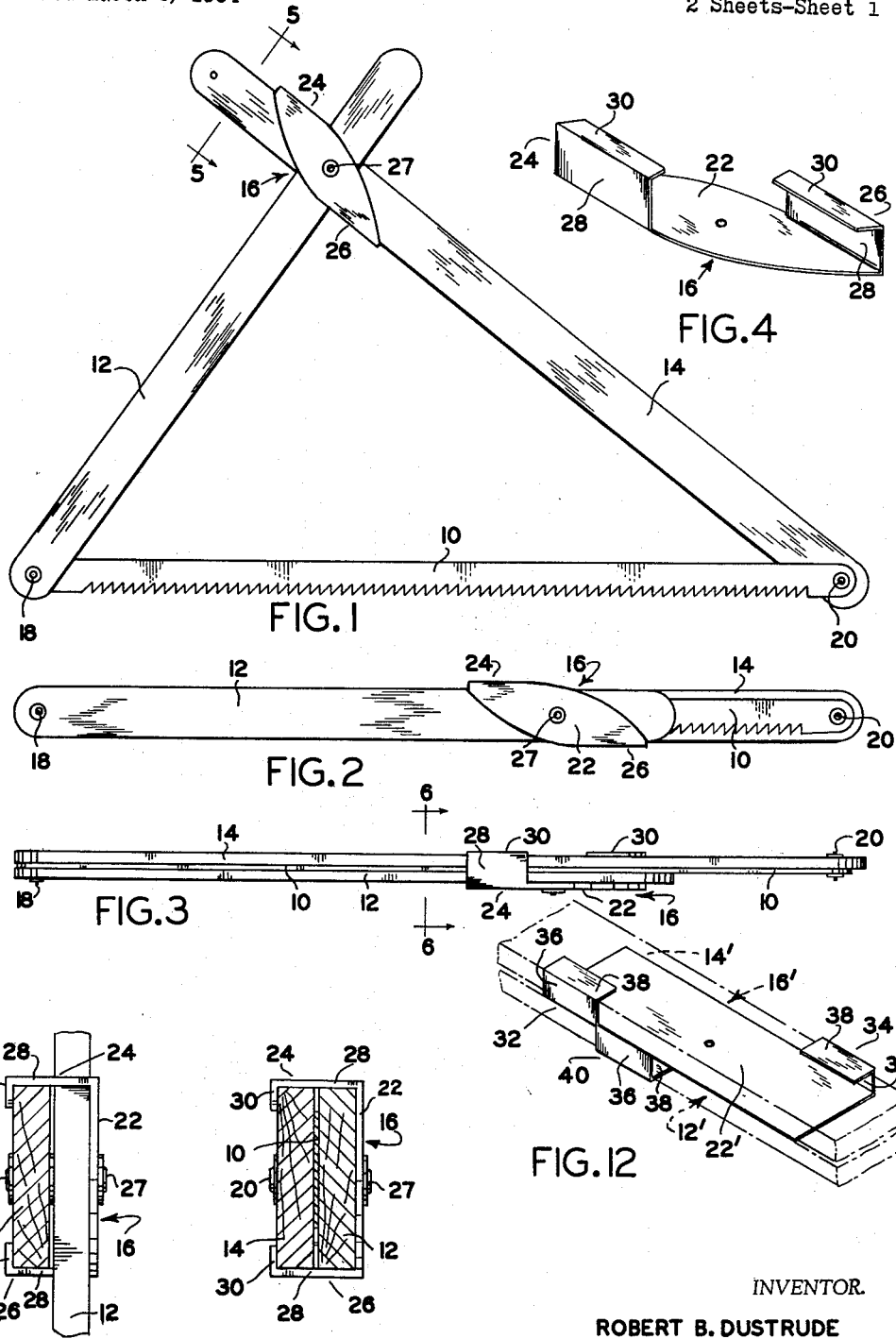
INVENTOR.
ROBERT B. DUSTRUDE
BY Mattis & Graybeal
ATTORNEYS June 29, 1965  R. B. DUSTRUDE  3,191,648
FOLDING FRAME HANDSAW Filed March 5, 1964  2 Sheets-Sheet 2

INVENTOR.
ROBERT B. DUSTRUDE
BY Mathis & Graybeal
ATTORNEYS

United States Patent Office 3,191,648
Patented June 29, 1965

3,191,648
FOLDING FRAME HANDSAW
Robert B. Dustrude, 1913 SW. 119th, Seattle, Wash.
Filed Mar. 5, 1964, Ser. No. 349,725
5 Claims. (Cl. 145—32)

The present invention relates to handsaws, and more particularly to the provision of a hand crosscut saw that is especially adapted for outdoor sportsmen and which is chiefly characterized by a folding truss frame or handle.

Outdoor sportsmen such as hunters, campers, Boy Scouts, Explorer Scouts, etc. have a definite need for a handsaw which is capable of being collapsed or folded into a small, compact package for convenient handling or storage during periods of non-use. A principal object of the present invention is the provision of such a handsaw which in addition to being small and compact when folded is completely self-contained, i.e. it has no loose components. Each component of such saw is always connected to another one of the saw's components.

Characteristically, handsaws constructed according to the present invention include a saw blade of tempered Swedish steel or the like and a frame or handle consisting of a first frame member that is wholly disposed on one side of the saw blade and is pivotally connected at one of its ends to one end of the saw blade, a second frame member that is wholly disposed on the opposite side of said saw blade and is pivotally connected at one of its ends to the opposite end of the saw blade, and a latch for locking or securing the frame members together, both when the saw is open and when it is closed or folded.

According to the invention, when the saw is folded the frame members extend parallel to each other on opposite sides of the saw blade and serve to cover and protect the teeth of the saw blade from dulling injury, and also to protect persons and property from injury or damage by the sharp teeth of the saw blade. In such closed position the latch, which is pivotally attached to one of the frame members, partially surrounds and engages the other frame member and serves to lock the frame members together. When the saw is open each frame member makes an acute angle with the saw blade and each sidelaps the other frame member, and the latch again partially surrounds and engages the frame member to which it is not connected and serves to couple the frame members together.

Another object of the invention is to provide a novel form of folding frame or handle for saw blades of all types which are adapted for use with a bow or truss type frame or handle, such as meat saw blades, wood saw blades, and saw blades adapted for cutting plastics or metals, for example.

A further object of the invention is to provide a self-contained, folding handsaw which requires a minimum amount of manipulation or handling for moving its components between their open and folded positions.

An additional object of this invention is to provide a novel folding handsaw that is practical, inexpensive to manufacture, and is capable of being produced in a wide range of sizes.

A still further object of the present invention is to provide a small compact handsaw that is durable and efficient throughout a long life of repetitious use and which at the same time is attractive in appearance.

These, together with other objects and advantages, which will become subsequently apparent, reside in the details of construction and operation as more fully herein described, reference being had to the accompanying drawings forming a part hereof, wherein like numerals and like letters refer to like parts throughout, and in which:

FIG. 1 is a side elevational view of the folding saw of the present invention in a fully open position, such view looking toward the closed side of the latch mechanism;

FIG. 2 is a side elevational view of the folding saw of FIG. 1 in its folded position, such view also looking toward the closed side of the latch mechanism;

FIG. 3 is a top plan view of the folding saw of the invention taken from an aspect above the view of FIG. 2, and showing the saw blade sandwiched between the two frame members and also showing the manner in which the hook elements of the latch mechanism surround and engage the frame members when the saw is folded;

FIG. 4 is a perspective view of the latch mechanism per se, taken from above and towards the open side, one edge and an end of said latch mechanism;

FIG. 5 is a sectional view taken through the frame member to which the latch mechanism is not attached and looking towards the joint involving the two frame members in side lapping position and the latch mechanism in the position which it occupies when the saw is fully open, such view being taken substantially along line 5—5 of FIG. 1;

FIG. 6 is a sectional view taken through both frame members and the saw blade, such view looking toward the latching mechanism when in the position which it occupies when the saw is closed and such latch mechanism is turned so as to lock all parts together, such view being taken substantially along line 6—6 of FIG. 3;

Figure 11:
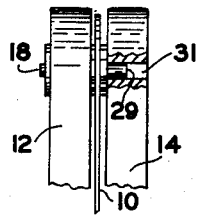

FIG. 11 is a fragmentary view on an enlarged scale looking towards the edge surfaces of the several elements making up one end portion of the saw when folded, such view being partly in section for clarity of illustration of the engagement by an opening in the free end of the longest frame member of a projecting end portion of the rivet used for pivotally connecting together the adjoining end portions of the saw blade and the other frame member; and FIG. 12 is a perspective view of a modified form of latch mechanism according to the invention, such view being taken from the same aspect as FIG. 4 and showing by broken lines the relationship of the two frame members when in their folded positions with respect to such latch mechanism.

Referring now to the drawings in more detail, the folding handsaw of the present invention is illustrated as comprising a saw blade 10, a first frame member 12, a second frame member 14, and a latch 16.

Figure 10:
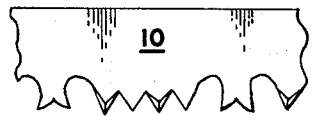
FIG. 10 is a fragmentary, side elevational view on an enlarged scale of a typical and therefore non-limitive form of saw blade useable in the folding saw of the present invention.

Saw blade 10 is preferably of a conventional crosscut type, adapted for cutting wood and for use in connection with a bow or truss type frame. Such a blade is illustrated in FIG. 10 and is adapted to cut on both the forward and backward strokes. This type of blade is preferred because it is considered that the present invention has its greatest utility with respect to camp saws, and that the principal need of campers is for a saw that will easily and readily cut firewood, posts, structural members for camp shelters, etc. However, it is to be understood that the present invention is not limited to the type of saw blade illustrated in FIG. 10, but has utility with any type of saw blade that is or can be adapted for use with a bow or truss type frame. Examples of other forms of saw blades to which the invention relates include pruning saw blades, meat saw blades, saw blades adapted for cutting plastics and saw blades adapted for cutting metals.

Frame members 12, 14 are preferably rectangular in shape and constructed of wood so as to render the saw as a whole buoyant. Thus if the saw is accidentally dropped by one using the same above a body of water or is accidentally dropped from a boat into the water, it will float and can be easily recovered. However, other suitable materials from which the frame members 12, 14 may be constructed include, but are not limited to: aluminum, lightweight aluminum alloys, magnesium, lightweight magnesium alloys, other types of lightweight metal alloys, plastics, and fiberglass.

A pin element, shown in the form of a rivet 18, but which could just as well be a bolt or the like, pivotally connects one end of frame member 12 to one end of blade 10. Similarly, a rivet or other pin element 20 pivotally connects one end of frame member 14 to the opposite end of blade 10. Frame member 12 is at all times wholly disposed on one side of blade 10 and frame member 14 is at all times wholly disposed on the opposite side of blade 10.

Figure 7:
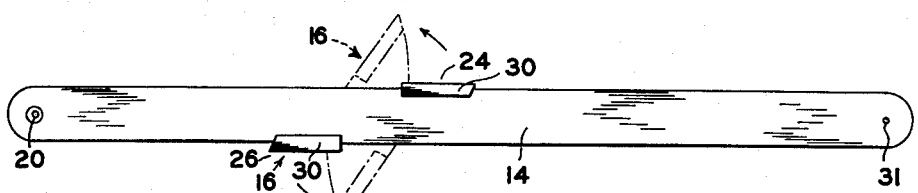
FIG. 7 is a side elevational view of the folding saw in its closed position, taken from an aspect directly opposite from FIG. 2, looking toward the open side of the latch mechanism, such view presenting a broken line illustration of the latch mechanism turned to its open position at which time the frame members can be separated or brought together through the throat of such latch mechanism.
Figure 8:
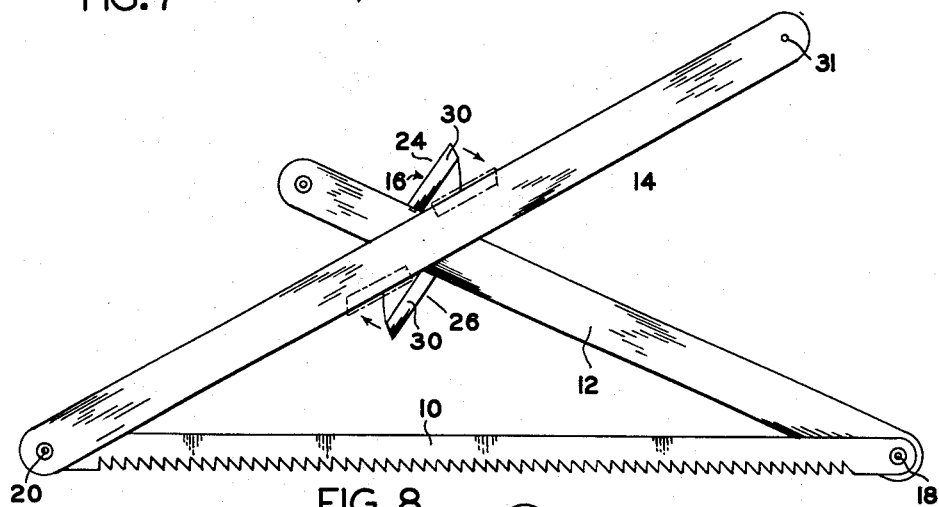
FIG. 8 is a side elevational view, also looking toward the open side of the latch mechanism and showing by solid lines the latch mechanism in an open position and also showing by broken lines, the latch mechanism in a position wherein it engages the frame member to which it is not attached, the frame members in this view being shown intermediate their respective open and folded positions.
Figure 9:
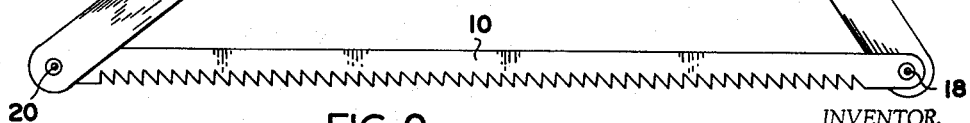
FIG. 9 is a view taken from the same aspect as FIGS. 7 and 8, but showing by solid lines the positions of all components when the saw is fully opened, such view also presenting a broken line showing of the components in the respective positions which they occupy when the saw is in partially closed position, prior to movement in the direction of the arrow to the fully opened position.

As shown by FIGS. 1, 8 and 9, when the saw frame is completely or partly open the frame members 12, 14 each form an acute angle with the saw blade 10 and sidelap each other. When the saw blade is closed (FIGS. 2, 3, 6 and 7) frame members 12, 14 extend parallel to each other on opposite sides of the saw blade 10 and serve to protect the blade 10 from dulling injury and also to protect persons and property from injury or damage that the sharp teeth of the blade 10 are capable of inflicting if left uncovered.

As perhaps best shown by FIG. 4, the preferred form of latch 16 comprises a base 22 and a pair of diagonally opposed hook elements 24, 26, and is pivotally connected to frame member 12 by a rivet 27 or the like. Each hook element 24, 26 includes a web 28 which extends substantially at a right angle to the base 22 and a flange 30 which extends substantially at a right angle to the adjoining web 28 and substantially parallel to the base 22. The diagonal spacing between the inboard ends of the hook elements 24, 26 is such that the width dimension of frame member 14 can be accommodated in the space between such hook elements 24, 26 when the latch 16 is in the position shown by solid line in FIG. 8 and by broken lines in FIG. 7, i.e. the position wherein it extends substantially transversely of frame member 12. The space between the hook elements 24, 26 may be termed an entrance passageway or "throat." The lateral spacing between webs 28 is equal to or slightly greater than the width of frame member 14, and the distance between base 22 and flanges 30 is equal to or slighter greater than the combined thicknesses of frame members 12, 14 and saw blade 10.

As best shown by FIGS. 2, 6 and 7, when the saw is folded and the latch 16 is turned into a position wherein the webs 28 extend contiguous the edge surfaces of frame members 12, 14, the flanges 30 extend over and partially surround the outboard surface of frame 14, and thus prevent separation of the frame members 12, 14.

When it is desired to open the saw the latch 16 is first rotated from the position shown in solid lines in FIG. 7 to the position shown by broken lines in FIG. 7. The two frame members 12, 14 are then grasped and pulled apart slightly until the inboard surface of frame member 14 is outboard of the flanges 30. The saw blade 10 is sufficiently flexible to permit such separation without either itself or the pivot joints 18, 20 being unduly stressed. Next, while the frame members are still separated they are both swung away from the edge of saw blade 10 that is without teeth. Frame member 14 is then reinserted into the space between hook elements 24, 26 of latch 16 (FIG. 8), and the latch 16 is once again rotated into a position wherein the webs 28 contact the edge surfaces of frame members 12, 14 and the flanges 30 overlie and engage the outboard side surface of frame member 14. Thereafter frame members 12, 14 are both pivotally moved further away from saw blade 10 until they will move no further. During such movement the latch 16 slides relatively along frame member 14 and rotates slightly relative to frame member 12. This continues until the inboard ends of webs 28 contact the edge surfaces of frame member 12 (FIG. 9) and further rotation is prevented. The two frame members 12, 14 are then pulled in the open direction an additional amount, so as to cause the frame member 14 to frictionally bind in the channel area formed between and by the hook elements 24, 26. This also puts the saw blade 10 in tension. The saw is then fully open and ready for use.

When it is desired to fold the saw the foregoing procedure is followed but in reverse order. It may be necessary to initially tap the free end of frame member 12 on a hard surface in order to free it from the frictional grasp of latch 16.

The free end of frame member 14 may be provided with an opening 31 for receiving and accommodating the end portion 29 of rivet 18, as shown by FIG. 11. The end portion 29 of rivet 18 is easily inserted into or removed from opening 31 by merely spreading apart the ends of frame members 12, 14 against the resistance of frame members 12, 14 which act like leaf springs. As is perhaps apparent, the engagement of portion 29 of rivet 18 within opening 31 aids to lock or secure the frame members 12, 14 together when they occupy their folded position.

In the accompanying drawings the folding saw shown is drawn substantially to scale. By way of typical and therefore non-limitive example, frame members 12, 14 may respectively measure sixteen and one-half inches (16½") and twenty-one and one-quarter inches (21¼") in length, and each measure about one and five-sixteenths inches (1 5/16") in width, and about five-sixteenths (5/16") of an inch in thickness, for a twenty-one inch (21") saw blade.

FIG. 12 illustrates a modified form of latch 17', the base 22' of which is disposed between and is pivotally attached to one or the other of frame members 12', 14'. Latch 16' includes a pair of hook elements extending out from each side of the base 22'.

Assuming that latch 16' is pivotally attached to frame member 12, when the saw is folded up the hook elements 32, 34, each of which includes a web 36 and a flange 38, partially surround and engage frame member 14'. The hook elements on the other side of base 22', one of which is shown and is designated 40 in FIG. 12, and each also including a web 36 and a flange 38, partially surround and engage frame member 12'. The inside width dimension of webs 36 is equal to or slightly greater than the thickness dimension of frame members 12', 14'. The width dimension of latch 16' between the inboard surfaces of webs 36 is equal to or slightly greater than the width dimension of frame members 12', 14'. When the saw is open and the latch mechanism 16' is turned into a "lock" position, the hook elements 32, 34 again engage and hold the frame member 14', whereas hook element 40 and its companion are offset on opposite sides of and situated generally at right angles to the frame member 12'.

From the foregoing, various other component arrangements and adaptations of the folding saws characteristic of the invention will be apparent to those skilled in the art to which the invention is addressed. Since changes, variations, and modifications in the form, construction, and the arrangement of the elements shown and described may be made without departing from the spirit of the invention, it is to be understood that the invention is to be limited solely by the scope of the appended claims, rather than by any details of the illustrative showing and foregoing description.

What is claimed is:

1. A folding handsaw comprising a saw blade and handle means movable between open and folded positions, said handle means comprising a pair of elongated handle members disposed outboardly on opposite sides of said saw blade, pin means pivotally connecting an end of one of said handle members to an end of the saw blade, and an end of the other handle member to the opposite end of said saw blade, said pin means permitting pivotal movement of said handle members between a handle closed position, wherein the handle members are disposed substantially parallel to each other on opposite sides of the saw blade, and a handle open position wherein the handle members each make an angle with the saw blade and the other handle member and sidelaps the other handle member, and latch means pivotally connected to one of said handle members and pivotally movable between a lock position, which it occupies when the handle members are in closed position, wherein a portion thereof partly surrounds the other handle member and locks the handle members together, and an open position wherein the handle members can be separated for movement to a handle open position, said latch means also being pivotally movable between a slidelock position, which it occupies when the handle members are in handle open position, wherein said portion thereof again partly surrounds said other handle member which is sidelapping the handle member to which the latch means is connected, and an open position wherein the handle members can be separated for movement to a handle closed position.

2. A folding saw according to claim 1, wherein said latch means is slidable relative to, and in surrounding relationship with, said other handle member when the handle members are in handle open position and said latch means is in slidelock position, and will frictionally bind when the handle members are moved to a fully open position so as to frictionally lock the said handle means open and put the saw blade in tension.

3. A folding saw according to claim 1, wherein the latch means comprises a base in juxtaposition with at least the frame member to which it is attached, and a plurality of hook elements, each extending first outwardly from and then parallel to said base, with said hook elements constituting said portion of the latch means that at least partly surround said other handle member.

4. A hand tool comprising: an elongated blade having first and second sides and first and second ends, and a frame attached thereto, said frame including a first frame member disposed outboardly of the first side of said blade and pivotally attached to the first end of said blade, a second frame member disposed outboardly of the second side of said blade and pivotally attached to the second end of said blade, said first and second frame members each extending at an acute angle with respect to said blade, and each side lapping the other, and latch means pivotally connected to said first frame member, said latch means comprising a base in juxtaposition with said first frame member and a plurality of hook elements, each extending first outwardly from and then parallel to said base, with said hook elements at least partly surrounding and engaging said second frame member.

5. A handsaw comprising an elongated, substantially straight, saw blade having an opening in each of its ends, and a foldable, triangular, truss frame serving as a handle for said saw, said truss frame comprising an elongated, substantially straight, first frame member wholly disposed on one side of said saw blade and having an end portion disposed outboardly contiguous one end of said blade, a pin element extending transversely through said end portion of the first frame member and also through said one end of the saw blade, pivotally connecting same together, an elongated, substantially straight, second frame member wholly disposed on the side of said saw blade opposite the first frame member and having an end portion disposed outboardly contiguous the opposite end of said saw blade, a second pin element extending transversely through said end portion of the second frame member and also through said opposite end of the saw blade, pivotally connecting same together, with said frame members being pivotally movable about said pin elements between closed and open positions, said frame members extending generally parallel to each other and the saw blade, on opposite sides of the said saw blade when in the closed position, and each making an angle with the saw blade and the other frame member and sidelapping the other frame member when in the open position, with said frame members being wider than said saw blade, and with the cutting edge of said blade being situated inwardly from the adjoining edges of said frame members when the frame members are in the closed position, and latch means for locking said frame members together both in the open and closed positions.

References Cited by the Examiner
UNITED STATES PATENTS

| | | | |
|---|---|---|---|
| 713,943 | 11/02 | Benjamin | 145—32 |
| 2,148,734 | 2/39 | DuJat | 145—32 |
| 2,734,536 | 2/56 | Harper | 145—32 |

WILLLIAM FELDMAN, *Primary Examiner.*

MILTON S. MEHR, *Examiner.*